Oct. 11, 1960  F. L. SOBERSKI  2,955,499
ROTOR BALANCING APPARATUS
Filed Nov. 16, 1955  2 Sheets-Sheet 1

INVENTOR
FLORYAN L. SOBERSKI

BY John C. Black
ATTORNEY

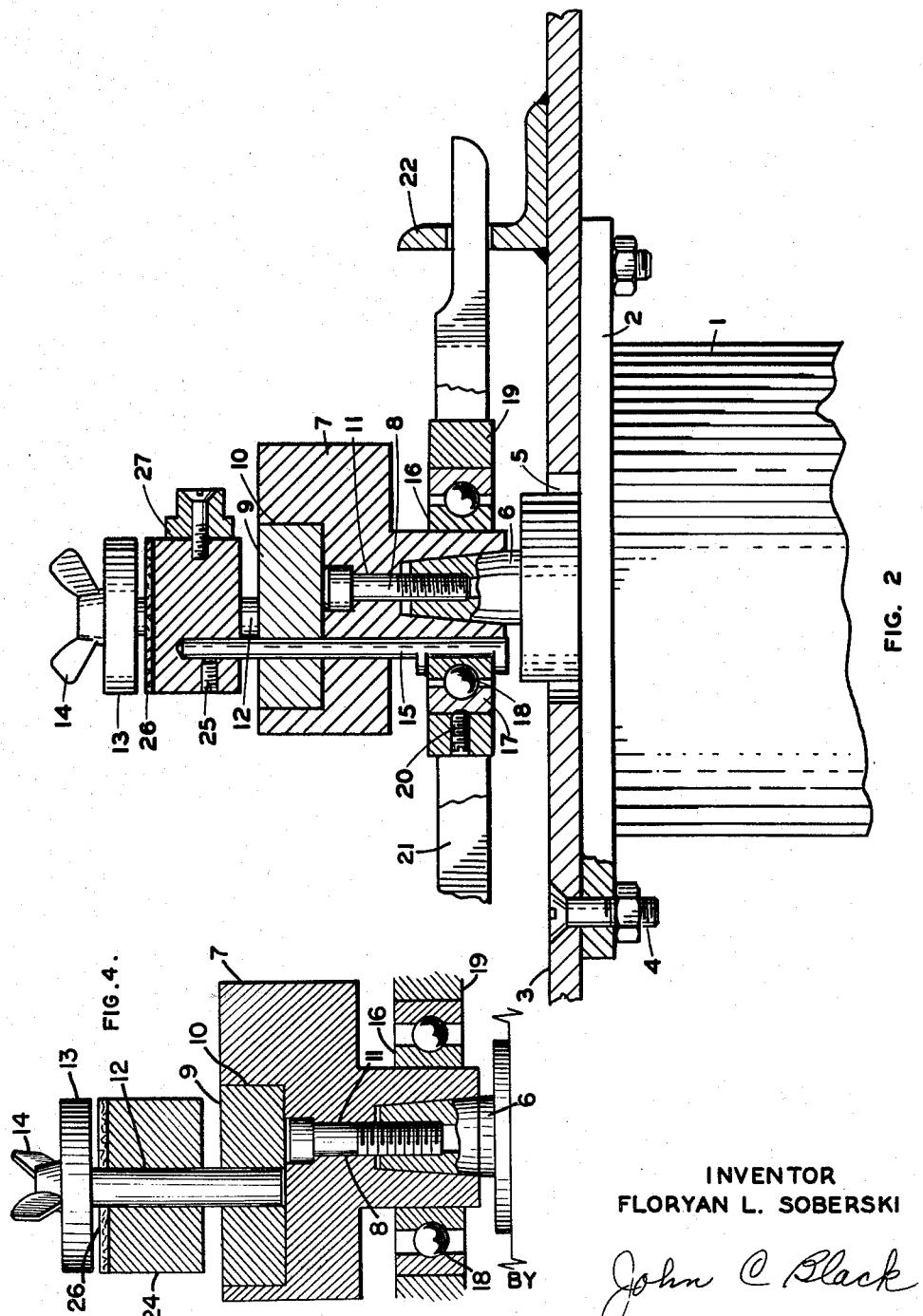

United States Patent Office 2,955,499
Patented Oct. 11, 1960

2,955,499
ROTOR BALANCING APPARATUS

Floryan L. Soberski, Downers Grove, Ill., assignor to Stewart-Warner Corporation, Chicago, Ill., a corporation of Virginia Filed Nov. 16, 1955, Ser. No. 547,067

18 Claims. (Cl. 82—1)

This invention relates to rotor balancing and more particularly to a method and means by which a rotor may be rotated eccentrically to determine the location of any unbalance that might exist therein, and by which said rotor may be balanced without being stopped.

It is the practice in balancing methods in use today to determine the location and amount of unbalance of a rotor in a machine and to balance said rotor after the machine has been stopped, and often after the rotor has been removed from the balancing machine and put on another machine. In many of these methods, complex arrangements must be used to determine the amount of unbalance; and, in many cases, the procedure is slow because the rotor must be brought up to a critical speed, allowed to rotate freely to a lower speed and then stopped to make a correction, this process being repeated several times.

The inventor herein proposes as his primary object the provision of a very simplified and rapid method for balancing a rotor in which method there is no necessity for spinning the rotor at critical speeds.

It is a further object of this invention to provide improved means for determining the location of unbalance on a rotating rotor and for correcting said unbalance without bringing the rotor to a stop.

A feature of this invention is the provision for determining the location of unbalance on a rotor by mounting said rotor on a shaft which is secured eccentrically to a rotating platform whereby centrifugal force will cause the heavy spot on the rotor to assume a position the greatest distance from the center line of rotation of the platform in which position the rotor remains stationary relative to its axis.

An additional feature is the provision of a means for locking said rotor in position after its heavy spot has assumed the above said position and the provision of a cutting tool to remove material from said heavy spot on the rotor while said rotor is being rotated eccentrically.

An additional feature is the method and means whereby the rotor is released subsequent to the removal of material from its heavy spot and is angularly displaced on its shaft and whereby the rotor characteristics are determined by observing whether or not the rotor again seeks a definite angular position which is indicative of the continued presence of a heavy spot.

Another feature is the location of the rotating fixture and the cutting tool on the same base so that any vibration affects both simultaneously in the same manner.

Other objects and features will be evident upon a perusal of the following description in which:

Fig. 2 shows an elevation view, partially in section, of the rotor spinning and braking apparatus;

Fig. 4 shows an elevation view partially in section in the plane intersecting the axis of the prime mover and the axis upon which the unbalanced body is mounted.

Figure 1:
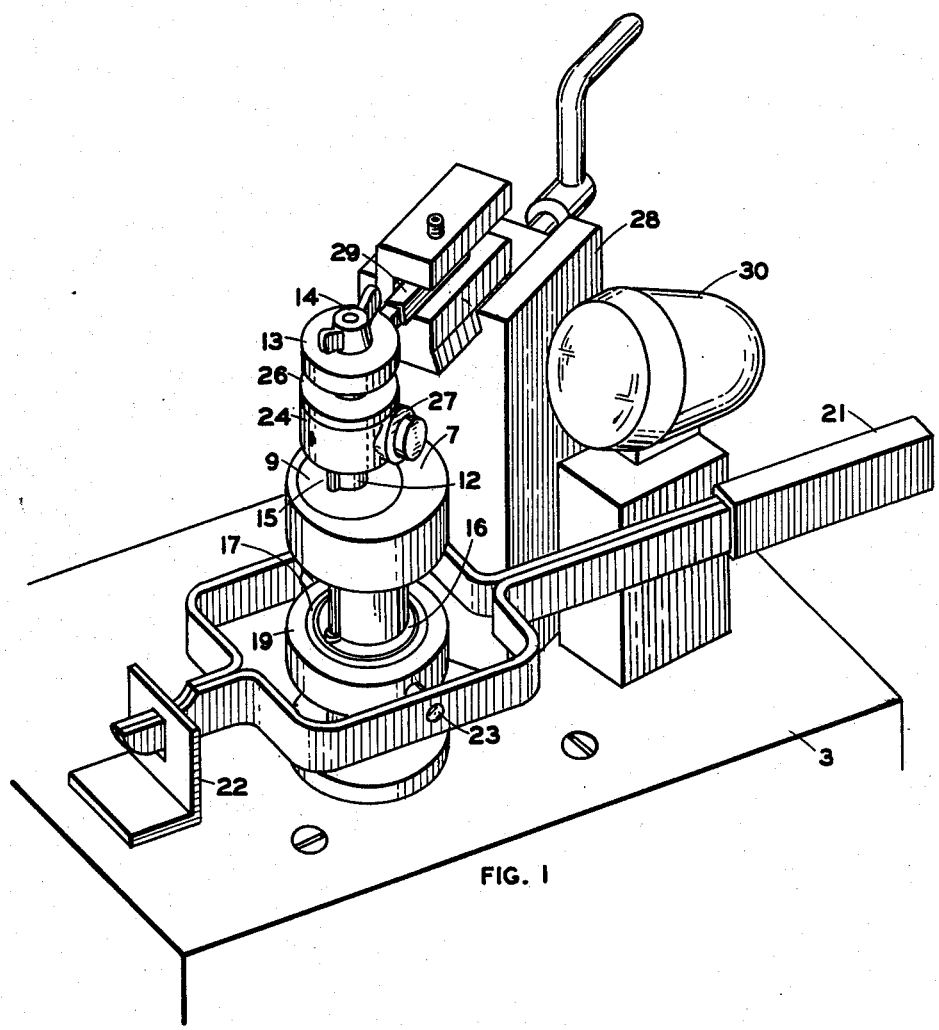
Fig. 1 shows a perspective view of the balancing apparatus.

A motor 1 having a flanged base 2 is secured to the underside of bench 3 by a suitable means, such as bolt and nut 4. An annular opening 5 is provided in bench 3 through which the shaft 6 of motor 1 is received, the end of shaft 6 being tapered. A hub-shaped platform 7 has a tapered counterbore which is secured on the tapered end of shaft 6 and held thereon by means of machine screw 8. A removable piece 9 is received in an eccentric recess 10 of platform 7, the recess being provided for the purpose of admitting said machine screw 8 into the axial bore 11 of platform 7. A post 12 is press fit into an axial bore in element 9. The upper end of post 12 is of a smaller diameter; the rotor 13, which is to be balanced, is mounted preferably on its own bearings on said upper end of post 12. Part of the upper portion of post 12 is threaded, and a wing nut 14 is screwed thereon to hold rotor 13 on post 12.

A brake stem 15 is received through vertically aligned eccentric bores in platform 7 and element 9, said stem being freely movable in a vertical direction. An annular ring 16 is disposed around the lower hub portion of platform 7. Said brake stem 15 is keyed at its lower end to said annular ring 16 so that ring 16 and brake stem 15 are rotated with platform 7. A second annular ring 17 is disposed about ring 16 and the adjacent edges of rings 16 and 17 are grooved to provide an annular race for ball-bearings 18. A third annular ring 19 is rigidly secured to ring 17 by means of machine screws 20. A brake handle 21 is pivoted on a fulcrum 22 which is secured to bench 3. Said brake handle 21 is formed so that its central portion is disposed around ring 19, and said brake handle 21 is pivoted on pins 23 which are press fit into ring 19; therefore, it is apparent that when brake handle 21 is raised or lowered, rings 16, 17 and 19, and brake stem 15 are raised and lowered therewith.

An annular brake 24, preferably having a leather disk secured to the upper edge thereof, is rigidly secured to the upper end of brake stem 15 by means of screw 25. Said brake 24 is provided with an axial bore, through which eccentric post 12 is received. A counter balancing weight 27 is rigidly secured to brake 24 for the purpose of reducing vibration resulting from the eccentrically placed load (post 12, brake 24, etc.), on platform 7.

Also secured to bench 3 is a compound 28 having a cutting tool 29 slidably secured thereon. A stroboscope 30 is secured to bench 3 for the purpose of permitting observation of the characteristics of rotor 13 while it is being rotated in a path about the axis of motor 1. Stroboscope 30 may be any one of several well known in the art, such as that described in the U.S. Patent No. 1,979,692 issued November 6, 1934 to Knowles. Briefly, the stroboscope 30 comprises one or more grid-controlled electric discharge tubes (not shown) the frequency of discharges being controlled by an electrical circuit including a manually adjustable multivibrator (not shown). The tubes are disposed at any convenient location with their emitted light directed at the rotor 13. The operator can adjust the multivibrator frequency to correspond to the frequency of rotation of motor 1. Then the flashes of light produced by the discharge tube will give a visual impression of the rotor standing still.

Figure 3:
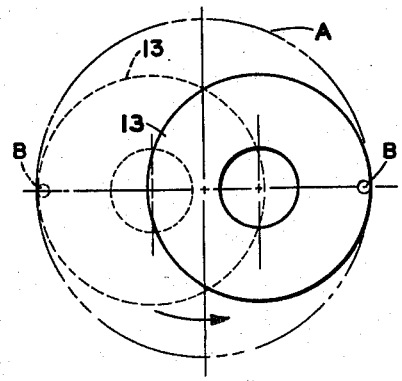
Fig. 3 shows diagramatically the path assumed by any unbalance in the rotor.

The operation of the apparatus is substantially as follows: With rotor 13 secured to eccentric post 12 as shown, the motor 1 is started. Rotor 13 is rotated in a circular path about the axis of motor 1; and, if there is a heavy spot B due to static unbalance, said heavy spot B will be moved to a position as far from the axis of motor 1 as possible by centrifugal force. In this position the heavy spot B will follow path A shown in Fig. 3. The stroboscope is caused to illuminate rotor 13 in synchronism with the rotation of rotor 13 about the axis of motor 1 in the manner set forth above to give the illusion of observing rotor 13 at rest in a certain position. Any suitable means, such as the eraser on a pencil for small balancing applications, may then be used to rotate rotor 13 about its axis on shaft 12 at a speed of rotation less than 20 cycles per second to permit visual observation.

If the rotor is balanced it will rotate slowly and uniformly about its axis on shaft 12, while shaft 12 is rotated by motor 1; however, if the rotor 13 is statically unbalanced, it will pendulate about its axis on shaft 12 while shaft 12 is rotated by motor 1 as the heavy spot B seeks to position itself as far as possible from the axis of motor 1 due to centrifugal force. The stroboscopic flashes of light, synchronized with the frequency of rotation of motor 1, cause the rotor 13 to be visually observed in the same relative position in each of its cycles of rotation about the axis of motor 1, whereby rotor 13 has the appearance of being mounted on a stationary axis. Consequently the slow rotation or the oscillating movement of rotor 13 on its shaft 12, due to the balanced or unbalanced condition of rotor 13, can be observed by the operator. To better observe the characteristics of the rotor 13, it is apparent that its outer surface can be suitably marked.

Assuming rotor 13 to be unbalanced with its heavy spot B in the above mentioned position, the brake handle 21 is raised to cause brake 24 to engage rotor 13 to hold rotor 13 against rotation on its axis. With rotor 13 so held against rotation on its axis, the rotor 13 and brake 24 continue to rotate in unison with platform 7 about the axis of shaft 6, thus bringing the heavy point on rotor 13 into engagement with the cutting tool 29 when advanced as shown in Fig. 1. The cutting tool 29 is brought into engagement with rotor 13 to remove material from rotor 13 at its heavy spot. The cutting tool 29 is then moved away from rotor 13, and the brake handle 21 is lowered to disengage brake 24 from rotor 13. Rotor 13 is again rotated upon its axis as described above, and its characteristics observed.

This squence of operations is repeated until the desired balance is obtained. In this regard, it will be noted that the cutting tool 29 removes material from rotor 13 symmetrically with respect to the point of unbalance; and, therefore, a removal of insufficient material will not shift the heavy spot B. The removal of too much material will merely cause the heavy spot B to be shifted 180 degrees.

It will be noted that platform 10 can be constructed of a mass which would make the mass of the eccentric parts (post 12, brake 24, rotor 13 and wing nut 14) relatively insignificant, thereby to reduce the amount of vibration caused by the unbalanced eccentric mass. In such a construction, the counter balancing weight 27 would not be necessary.

It will be further noted that the bench 3 can be resiliently mounted to absorb shock and vibration.

It will also be noted that the cutting tool 29 (as well as rotor 13) is mounted on bench 3; and, as a result thereof, a reasonable amount of vibration will not be harmful because cutting tool 29 will vibrate substantially in sequence with rotor 13.

While there has been described one mode of the invention, it will be understood that various changes and modifications may be made therein; and it is contemplated to cover in the appended claims all such changes and modifications which fall within the true spirit and scope of the invention.

What is claimed is:

1. The method of locating and correcting unbalance in a rotatable body comprising the steps of rotatably mounting said body on a rigid shaft, moving said shaft in a substantially circular path about a defined axis non-coaxial with the axis of said shaft to cause the heavy spot on said body to assume a position farthest from said defined axis, holding said body in said position against rotation relative to said shaft while said shaft moves in said path, altering the mass of said body substantially symmetrically with respect to the plane intersecting said axes and the center of unbalance of the body to reduce the unbalance thereof while said shaft is moving in said circular path.

2. The method claimed in claim 1 together with the steps of releasing said body, angularly displacing said body on said shaft while the shaft moves in said path, observing the effect of said displacement on said body and repeating said steps until satisfactory balance is obtained.

3. The method of locating and correcting the unbalance in a rotatable body comprising the steps of rotatably mounting said body on a vertical post, moving said post in a substantially circular path about a defined vertical axis non-coaxial with the axis of said post to cause the heavy spot on body to assume a position farthest from said defined axis, preventing rotation of said body relative to said post while said post moves in said path, removing material from said heavy spot while said post is moving in the said circular path, releasing said body for rotation relative to said post, angularly displacing said body on said post, periodically illuminating said body in synchronism with its movement in said circular path, observing the effect of said displacement on said body and repeating said steps until satisfactory balance is obtained.

4. The method of locating and correcting static unbalance in a rotatable body comprising the steps of mounting said body for rotation about its geometric axis, moving said body in a substantially circular path about a predetermined non-coaxial second axis to cause the heavy spot of said body to assume a position farthest from said second axis, holding said body in said position against rotation relative to its geometric axis while it moves in said path, and altering the mass of said body substantially symmetrically with respect to the plane intersecting said geometric axis and the center of said heavy spot in a manner reducing the amount of unbalance in said rotor while the rotor moves in said path.

5. The method claimed in claim 4 together with the steps of releasing said body for rotation relative to its own geometric axis, angularly displacing said body relative to its geometric axis while it moves in said circular path to cause rotation of said body about its axis if balanced and pendulum motion of the body about its axis if unbalanced, periodically illuminating said body in synchronism with its movement in said circular path for observation by an operator so that he can determine the effect of said displacement on said body, and repeating said steps until satisfactory balance is obtained.

6. The method of locating and correcting static unbalance in a rotatable body comprising the steps of mounting said body for rotation about its geometric axis, moving said body in a substantially circular path about a predetermined non-coaxial second axis to cause the heavy spot of said body to seek a position farthest from said second axis, angularly displacing said body relative to its geometric axis while it moves in said circular path to cause rotation of said body about its axis if balanced and pendulum motion of the body about its axis if unbalanced, periodically illuminating the body in synchronism with its movement in said circular path for observation by an operator to permit a determination of the effect of said displacement on said body, holding said body when unbalanced against rotation relative to its geometric axis while it moves in said path, altering the mass of said body substantially symmetrically with respect to the plane intersecting said geometric axis and the center of said heavy spot in a manner reducing the amount of unbalance in said rotor while the rotor moves in said path.

7. Apparatus for balancing a rotatable body comprising a substantially rigid shaft, means for rotatably mounting said body on said shaft, means supporting said shaft for movement in a substantially circular path about a non-coaxial predetermined axis for causing the heavy spot of the body to assume a position farthest from the axis of the circular path, means carried by the supporting means for preventing rotation of the body relative to the shaft while the shaft moves in the path, and means carried by the supporting means for altering the mass of the body substantially symmetrically with respect to the plane intersecting the predetermined axis and the center of unbalance of the body to reduce the unbalance thereof while the shaft moves in said circular path.

8. Apparatus for balancing a rotor comprising a substantially vertically disposed post, means for rotatably mounting the rotor on the post, means supporting the post for movement in a substantially circular path about a defined vertical axis non-coaxial with the axis of the post to cause the heavy spot of the rotor to assume a position farthest from the axis of the path, means carried by the supporting means for preventing movement of the rotor relative to the post while the post moves in said circular path, means carried by the supporting means for altering the mass of the rotor substantially symmetrically with respect to the plane intersecting the defined axis and the center of the heavy spot to reduce the unbalance thereof, and stroboscope means synchronized with the movement of the post in the circular path for permitting observation of the reaction of the rotor to angular displacement on the post by an operator.

9. Apparatus for locating and for correcting static unbalance in a rotor comprising a bench, a motor secured to said bench with its shaft vertically disposed, a platform rigidly secured to the upper end of the shaft for rotation therewith, a vertical post secured on the platform eccentrically with respect to the axis of the shaft, means for rotatably mounting the rotor on the post, brake means carried by the bench and shaft for preventing movement of the rotor relative to the post, means carried by the bench for removing material from the rotor as it is moved with said eccentrically mounted post in a substantially circular path about the axis of the motor, and stroboscope means for permitting observation of the effect of angular displacement of the rotor on the post by an operator.

10. Balancing apparatus comprising, in combination, carrier means for carrying at a predetermined part thereof an article to be balanced for free turning movement about its axis; and support means supporting said carrier means for rotation about an axis spaced from and not intersecting with the axis of the article, whereby an article to be balanced rotates about an axis eccentric to itself when rotating with said carrier means so that any unbalance existing in the article will cause turning of the article about its own axis until the heaviest portion thereof assumes a position more distant from the axis of rotation of the carrier means than any other part of the article.

11. Balancing apparatus comprising, in combination, carrier means for carrying at a predetermined part thereof an article to be balanced for free turning movement about its axis with the axis of the article extending in a predetermined direction; support means supporting said carrier means for rotation about an axis spaced from and parallel to the axis of the article carried by the carrier means, whereby an article to be balanced rotates about an axis eccentric to itself when rotating with said carrier means so that any unbalance existing in the article will cause turning of the article about its own axis until the heaviest portion thereof assumes a position more distant from the axis of rotation of the carrier means than any other part of the article; and means carried by said support means for altering the mass of an article carried by said carrier means while the article rotates about said axis of rotation of the carrier means after the heaviest portion of the article has assumed said position.

12. The method of locating static unbalance in a rotatable body comprising steps of mounting said body for free rotation about its axis, and moving the body in a substantially circular path about a predetermined second axis spaced from and substantially parallel with the body axis to cause the heavy portion to assume a position farthest from the second axis.

13. The method of locating static unbalance in a rotatable body comprising the steps of mounting the body for free rotation about its axis, moving the body in a circular path about a second axis spaced from and substantially parallel with the body axis so that any unbalance existing in the body will cause turning of the body about its axis until the heaviest portion thereof assumes a position more distant from the second axis than any other part of the body, and periodically illuminating the body in synchronism with its movement in said circular path for observation of the position of the body by an operator.

14. The method of locating static unbalance in a rotatable body comprising the steps of mounting the body for free rotation about its axis, moving the body in a circular path about a second axis spaced from and substantially parallel with the body axis so that any unbalance existing in the body will cause turning of the body about its axis until the heaviest portion thereof assumes a position more distant from the second axis than any other part of the body, angularly displacing the body relative to its own axis while it moves in said circular path to cause rotation of the body about its axis if it is balanced and pendulum motion of the body about its axis if it is unbalanced, and periodically illuminating the body in synchronism with its movement in the circular path to permit observation of the effect of said displacement by an operator.

15. Balancing apparatus comprising, in combination, carrier means for carrying at a predetermined part thereof an article to be balanced for free turning movement about its axis with the axis of the article extending in a predetermined direction; and support means supporting said carrier means for rotation about an axis spaced from and parallel to the axis of the article carried by said carrier means, whereby an article to be balanced rotates about an axis eccentric to its own axis when rotating with said carrier means so that any unbalance existing in the article will cause turning of the article about its own axis until the heaviest portion thereof assumes a position more distant from the axis of rotation of the carrier means than any other part of the article.

16. Balancing apparatus comprising, in combination, carrier means for carrying at a predetermined part thereof an article to be balanced for free turning movement about its axis with the axis of the article extending in a predetermined direction; support means supporting said carrier means for rotation about an axis spaced from and parallel to the axis of the article carried by the carrier means, whereby an article to be balanced rotates about an axis eccentric to itself when rotating with said carried means so that any unbalance existing in the article will cause turning of the article about its own axis until the heaviest portion thereof assumes a position more distant from the axis of rotation of the carrier means than any other part of the article; and means carried by said support means for reducing the mass of an article carried by said carrier means while the article rotates about said axis after the heaviest portion of the article has assumed said position.

17. Balancing apparatus comprising, in combination, carrier means for carrying at a predetermined part thereof an article to be balanced for free turning movement about its axis with the axis of the article extending in a predetermined direction; support means supporting said carrier means for rotation about an axis spaced from and parallel to the axis of the article carried by the carrier means, whereby an article to be balanced rotates about an axis eccentric to itself when rotating with said carrier means so that any unbalance existing in the article will cause turning of the article about its own axis until the heaviest portion thereof assumes a position more distant from the axis of rotation of the carrier means than any other part of the article; and cutting means carried by said support means for cutting away part of the mass of an article carried by said carrier means while the article rotates about said axis after the heaviest portion of the article has assumed said position.

18. Balancing apparatus comprising, in combination, carrier means for carrying at a predetermined part thereof an article to be balanced for free turning movement about its axis with the axis of the article extending in a predetermined direction; support means supporting said carrier means for rotation about an axis spaced from and parallel to the axis of the article carried by the carrier means, whereby an article to be balanced rotates about an axis eccentric to itself when rotaing with said carrier means so that any unbalance existing in the article will cause turning of the article about its own axis until the heaviest portion thereof assumes a position more distant from the axis of rotation of the carrier means than any other part of the article; and stroboscope means carried by said support means for rendering the position of the article to be balanced easily observable by the operator.

References Cited in the file of this patent

UNITED STATES PATENTS

| | | |
|---|---|---|
| 2,171,927 | Fuchs | Sept. 5, 1939 |
| 2,449,563 | Minorsky | Sept. 21, 1948 |
| 2,536,226 | Reynolds | Jan. 2, 1951 |
| 2,690,075 | Kryeske | Sept. 28, 1954 |
| 2,746,299 | Federn | May 22, 1956 |

FOREIGN PATENTS

| | | |
|---|---|---|
| 71,073 | Germany | Feb. 7, 1893 |
| 165,668 | Germany | Dec. 20, 1904 |

UNITED STATES PATENT OFFICE

CERTIFICATION OF CORRECTION

Patent No. 2,955,499           October 11, 1960

Floryan L. Soberski

It is hereby certified that error appears in the above numbered patent requiring correction and that the said Letters Patent should read as corrected below.

Column 2, line 61, for "tube" read -- tubes --; column 6, line 59, for "carried" read -- carrier --.

Signed and sealed this 23rd day of May 1961.

(SEAL)
Attest:

ERNEST W. SWIDER          DAVID L. LADD
Attesting Officer           Commissioner of Patents